Patented Nov. 30, 1948

2,454,978

UNITED STATES PATENT OFFICE 2,454,978

4-ALKYLMORPHOLINE SULFUR TRIOXIDE COMPOUNDS

Mario Scalera, Somerville, N. J., Charles T. Lester, De Kalb, Ga., and Elizabeth M. Hardy, Bound Brook, N. J., assignors to American Cyanamid Company, New York, N. Y., a corporation of Maine No Drawing. Application January 18, 1946, Serial No. 642,102

4 Claims. (Cl. 260—247)

This invention relates to new sulfur trioxide addition compounds of N-hydrocarbon substituted morpholines, the hydrocarbon substituent being an aliphatic group, saturated or unsaturated having not more than five carbon atoms. In the morpholine ring it is customary to number the oxygen atom 1. Thus the compounds of the present invention may be referred to as 4-hydrocarbon substituted morpholines and this type of nomenclature will be used throughout the specification and claims.

These sulfur trioxide compounds are of considerable commercial importance. They have the special property of being sufficiently stable to act effectively in aqueous solution as esterifying agents for various phenols and particularly leuco vat dyestuffs. Examples of sulfur trioxide compounds claimed in the present application are the addition products of 4-methylmorpholine, 4-ethylmorpholine, 4-propylmorpholines, 4-butylmorpholines, 4-amylmorpholines, 4-allylmorpholine and 4-methallylmorpholine. The 4-methyl- and 4-ethylmorpholine sulfur trioxide compounds assume relatively greater importance because of the economy and ready availability of the alkylating agents used for their preparation.

The new compounds are white crystalline solids which are only slowly decomposed in the presence of moisture to form the corresponding morpholine sulfate or pyrosulfate. The dry compounds may be handled and stored in the absence of moisture without decomposition.

The morpholine sulfur trioxide compounds are obtained by combining one mol of the morpholine compound with one mol of sulfur trioxide. Several procedures can be employed to bring about this result, the preferred procedure varying with the individual morpholine compound. The reaction may be carried out, for example, by conducting the sulfur trioxide directly into the morpholine compound, or by reaction of the two ingredients in an anhydrous solvent. The sulfur trioxide compounds can also be obtained by reaction of the 4-substituted morpholines with chlorosulfonic acid or alkylchlorosulfonates in a solvent. Another method is to react the oxide of the 4-substituted morpholine with sulfur dioxide in aqueous solution. In general, milder and more carefully controlled conditions are required for the 4-alkenylmorpholines.

The compounds of the present invention may also be prepared by an improved process in which a crude product salted out from the alkylation mixture of morpholine or an aqueous distillate thereof is extracted with halogenated hydrocarbons, such as ethylene chloride, and then treated with sulfur trioxide. This improved process of manufacturing the compounds is not claimed as such in the present case, it constituting the subject matter of the copending application of Hardy, Serial No. 642,103, filed January 18, 1946. The process of using the compounds for the manufacture of water soluble sulfuric ester salts of leuco quinones is the subject matter of the copending application of Lecher, Scalera, and Lester, Serial No. 518,584, filed January 17, 1944, and which issued as Patent No. 2,403,226.

The invention will be more fully set forth in connection with the following specific examples, which are illustrative only, and not by way of limitation. All parts are parts by weight.

EXAMPLE 1

4-ethylmorpholine-sulfur trioxide

Ten parts of sulfur trioxide are slowly distilled into a solution of 14.5 parts of 4-ethylmorpholine in 150 parts of chloroform cooled to −10° C. The product which separates is filtered, washed with cold chloroform and dried in a vacuum desiccator. The sulfur trioxide compound, M. P. 140°–145° C., is obtained.

EXAMPLE 2

4-ethylmorpholine-sulfur trioxide 29 parts of chlorosulfonic acid are added dropwise, with stirring, to a cold solution of 58 parts of 4-ethylmorpholine in 75 parts of chloroform at such a rate that the temperature remains below 15° C. After the addition is complete, the solution is allowed to warm to room temperature. The chloroform is removed by heating under reduced pressure. The residue is slurried with water which dissolves the 4-ethyl-morpholine hydrochloride and the crystalline mass which separates is filtered, washed and dried. The sulfur trioxide compound of 4-ethylmorpholine, M. P. 140°–144° C., is obtained.

EXAMPLE 3

4-ethylmorpholine-sulfur trioxide 36 parts of ethyl chlorosulfonate are added dropwise to a solution of 29 parts of 4-ethylmorpholine in 66 parts of dry benzene at such a rate that the reaction mixture is maintained at about 30° C. The mixture is stirred for a few minutes after the addition is completed. The benzene is then decanted and the solid residue is slurried with 5% aqueous sodium acetate solution and dried. The 4-ethylmorpholine sulfur trioxide compound is obtained. Equally good results are obtained if dry ether is used as a solvent in place of the benzene.

EXAMPLE 4

4-ethylmorpholine-sulfur trioxide 22.8 parts of sulfur trioxide freshly distilled from 65% oleum are dissolved in 286 parts of liquid sulfur dioxide kept cool in an ice-salt bath. 32.8 parts of 4-ethylmorpholine are then added dropwise with stirring and cooling. The mixture is stirred with cooling for a few minutes after all the 4-ethylmorpholine has been added. It is then allowed to come to room temperature whereupon the sulfur dioxide evaporates. The residue of 4-ethylmorpholine sulfur trioxide is then stirred with 5% aqueous sodium acetate solution, filtered and dried.

EXAMPLE 5

4-ethylmorpholine-sulfur trioxide 9.5 parts of sulfur trioxide are slowly passed into 40 parts of dry 4-ethylmorpholine which is cooled externally. The solid mass which results is filtered and the press cake slurried in cold water, filtered and washed with small portions of cold water. The solid 4-ethylmorpholine sulfur trioxide compound is then dried in vacuo.

EXAMPLE 6

4-ethylmorpholine-sulfur trioxide

A slow stream of sulfur dioxide is passed into an aqueous solution containing 4-ethylmorpholine oxide at 10°–15° C. until the solution becomes acid, and for a few minutes thereafter. The solid 4-ethylmorpholine sulfur trioxide compound which forms is filtered, washed with several portions of ice water and dried. The yields are increased when the reaction is carried out in 50% aqueous ethyl, isopropyl or tertiary butyl alcohols. The presence of acids such as acetic, maleic or citric also have a favorable influence on this reaction.

EXAMPLE 7

4-methylmorpholine-sulfur trioxide 12.7 parts of 4-methylmorpholine are dissolved in 150 parts of chloroform and the resulting solution is cooled externally. 9.5 parts of sulfur trioxide are then distilled in with cooling and stirring. The white solid is removed by filtration, washed with sodium acetate solution, and dried. The 4-methylmorpholine sulfur trioxide compound, M. P. 190°–195° C., is obtained.

EXAMPLE 8

4-allylmorpholine-sulfur trioxide 38.1 parts of 4-allylmorpholine, boiling at 155°–157° C. (prepared by the reaction of allylchloride with morpholine in aqueous alkaline solution) are added to 125 parts of ethylene chloride in a vessel protected from atmospheric moisture. 17.5 parts of chlorosulfonic acid are added dropwise while the reaction is maintained at 10°–15° by external cooling. When all of the chlorosulfonic acid has been added, the mixture is heated for one-half hour at 50° and the solvent is then removed under reduced pressure. The residue from the distillation is slurried in dilute, cold, aqueous sodium acetate solution and the insoluble material is filtered off and washed with aqueous sodium acetate. The filter cake is dried in vacuo. The resulting 4-allylmorpholine sulfur trioxide compound is a white solid, melting at 129–143° C., and is very slightly soluble in water.

EXAMPLE 9

174 parts of morpholine in 120 parts of water are ethylated by gradual addition of 308 parts of diethyl sulfate and 80 parts of sodium hydroxide in 320 parts of water at a temperature of 50–70° C. The solution is then stirred for approximately one hour longer at 60° C. Upon completion of the reaction, 35 parts of salt are added and the mixture is heated to 75° C. Then 940 parts of ethylene dichloride are added, the mixture is stirred well and the upper layer of ethylene dichloride is drawn off. Ten parts of potassium carbonate are then added, the solution is clarified and the clarified solution is distilled until essentially all the water is removed. The amount of 4-ethylmorpholine contained in the dry ethylene chloride solution is determined and slightly less than the equivalent amount of sulfur trioxide is passed in at 10–15° C. The solution is then gradually heated to 75° C. and kept at this temperature for one hour. It is then cooled to 5–10° C., filtered and washed with a little dry ethylene chloride. The product is obtained in high yield as a nearly white, crystalline solid melting at 148–150° C.

Substantially equivalent results are obtained if a corresponding amount of dimethyl sulfate is substituted for the diethyl sulfate in the alkylation. The 4-methylmorpholine sulfur trioxide compound obtained is a white crystalline solid, M. P. 190–195° C.

EXAMPLE 10

174 parts of morpholine are ethylated as described in Example 9. The mixture is then distilled with stirring until 514 parts of distillate are collected. 106.8 parts of salt are then added to the distillate and the mixture warmed to dissolve the salt and produce an upper layer of 4-ethylmorpholine. 800 parts of ethylene chloride are added and the layers separated after stirring. The wet ethylene chloride solution is then dried by distilling off part of the solvent, and the amount of 4-ethylmorpholine contained in the dry ethylene chloride solution is determined. This dry solution of 4-ethylmorpholine in ethylene chloride is used for the preparation of the sulfur trioxide addition product as described in Example 9. The 4-ethylmorpholine sulfur trioxide compound is obtained in a pure state in excellent yield.

EXAMPLE 11

205 parts of an alkylation mixture (prepared from 43.5 parts of morpholine as described in Example 9) are treated with 8.5 parts of salt and 250 parts of a mixture consisting of about 15% mixed butyl chlorides and ethylene chloride. The solvent layer is separated off and dried as in Example 9. Slightly less than the theoretical amount of sulfur trioxide is distilled into the mixture at 10–15° C. The solution is then gradually heated to 75° C. and kept at this temperature for one hour. It is then cooled to 5–10° C., filtered and washed with a little of the dry solvent. A stable sulfur trioxide compound is obtained in good yield.

We claim:

1. A sulfur trioxide compound of 4-hydrocarbon substituted morpholine in which the hydrocarbon substituent is an aliphatic hydrocarbon radical having not more than five carbon atoms.

2. The sulfur trioxide compound of 4-methylmorpholine.

3. The sulfur trioxide compound of 4-ethylmorpholine.

4. The sulfur trioxide compound of 4-allylmorpholine.

MARIO SCALERA.
CHARLES T. LESTER.
ELIZABETH M. HARDY.

REFERENCES CITED

The following references are of record in the file of this patent:

UNITED STATES PATENTS

| Number | Name | Date |
| --- | --- | --- |
| 1,835,841 | Beckett et al. | Dec. 8, 1931 |

OTHER REFERENCES

Berichte, vol. 16 (1883), p. 1267.
Jour. Am. Chem. Soc. (July 1944), 66, pp. 1087–1091.